(12) United States Patent
Hu et al.

(10) Patent No.: US 9,626,172 B2
(45) Date of Patent: Apr. 18, 2017

(54) DEPLOYING A CLUSTER

(71) Applicant: International Business Machines Corporation, Armonk, NY (US)

(72) Inventors: Yan Yan Hu, Beijing (CN); Tian Cheng Liu, Beijing (CN); Ling Shao, Beijing (CN); Qi Ming Teng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 14/526,632

(22) Filed: Oct. 29, 2014

(65) Prior Publication Data

US 2015/0120887 A1    Apr. 30, 2015

(30) Foreign Application Priority Data

Oct. 31, 2013  (CN) .......................... 2013 1 0533486

(51) Int. Cl.

| | |
|---|---|
| *G06F 15/177* | (2006.01) |
| *G06F 9/445* | (2006.01) |
| *H04L 12/24* | (2006.01) |
| *H04L 29/12* | (2006.01) |

(52) U.S. Cl.

CPC ................. *G06F 8/63* (2013.01); *G06F 8/61* (2013.01); *H04L 41/0806* (2013.01); *H04L 41/0893* (2013.01); *H04L 41/0889* (2013.01); *H04L 61/2038* (2013.01); *H04L 61/6022* (2013.01)

(58) Field of Classification Search
USPC ......................................... 709/220–223, 227
See application file for complete search history.

(56) References Cited

U.S. PATENT DOCUMENTS

| | | | |
|---|---|---|---|
| 8,281,307 B2 | 10/2012 | Arnold et al. | |
| 2012/0233611 A1 | 9/2012 | Voccio | |
| 2012/0246639 A1 | 9/2012 | Kashyap et al. | |
| 2013/0238687 A1* | 9/2013 | Yamashita | G06F 9/4416 709/203 |
| 2014/0052877 A1* | 2/2014 | Mao | H04L 61/103 709/245 |
| 2014/0267580 A1* | 9/2014 | Parent | H04N 7/141 348/14.12 |

* cited by examiner

*Primary Examiner* — Lan-Dai T Truong
(74) *Attorney, Agent, or Firm* — Peter J. Edwards

(57) ABSTRACT

A method and system for deploying a cluster, wherein the cluster contains a plurality of cluster members, the method comprising: obtaining a unique identifier for each cluster member; according to the unique identifier of each cluster member, obtaining cluster configuration information for the cluster member; configuring the cluster member using the obtained cluster configuration information of the cluster member; and deploying the cluster. The method and system can enhance the cluster deployment efficiency.

10 Claims, 5 Drawing Sheets

DEPLOYING A CLUSTER

CROSS REFERENCE TO RELATED APPLICATION

This application claims priority to Chinese Patent Application No. 201310533486.0, filed Oct. 31, 2013, which is incorporated herein in its entirety.

BACKGROUND

The present disclosure relates to clusters, and more specifically, to a method and system for deploying a cluster.

Service continuity and availability are critical evaluation indexes in an enterprise computing environment, while a cluster environment ensures service continuity and availability to the utmost by using redundant abilities of computation and resources provided by multiple members. Even if services on a certain cluster member are interrupted, other member in the cluster can automatically and rapidly take over these services, so that service interruptions do not impact users.

SUMMARY

Embodiments of the present disclosure are directed toward deploying a cluster, where the cluster contains a plurality of cluster members. The method may include obtaining a unique identifier for each cluster member; obtaining cluster configuration information for individual cluster members according to the unique identifier for each cluster member; configuring cluster members based upon the cluster configure information for individual cluster members; and deploying the cluster.

Certain embodiments of the present disclosure are directed toward a system for deploying a cluster having a plurality of cluster members, the system comprising: a unique identifier obtaining tool configured to obtain the unique identifier for each cluster member; a cluster configuration information obtaining tool configured to, according to the unique identifier for a cluster member, obtain cluster configuration information for the cluster member; a configuring tool configured to configure the cluster member using the obtained cluster configuration information for the cluster member; and a deploying tool configured to deploy the cluster.

The method and system describing present disclosure may enhance the deployment efficiency of a cluster environment. The above summary is not intended to describe each illustrated embodiment or every implementation of the present disclosure.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference may refer to the same components in the embodiments of the present disclosure.

DETAILED DESCRIPTION

Figure 1:
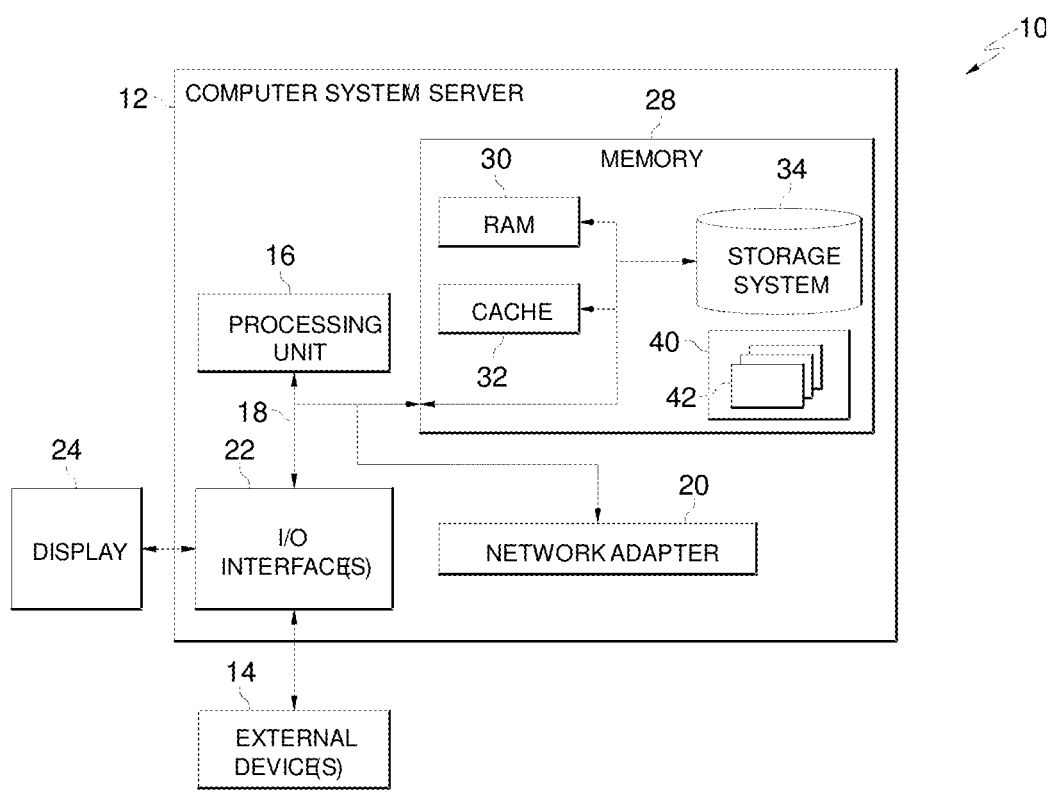
FIG. 1 depicts a cloud computing node according to one embodiment of the present disclosure.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is illustrated. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As illustrated in FIG. 1, computer system/server 12 in cloud computing node 10 is illustrated in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not illustrated and typically called a "hard drive"). Although not illustrated, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not illustrated, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
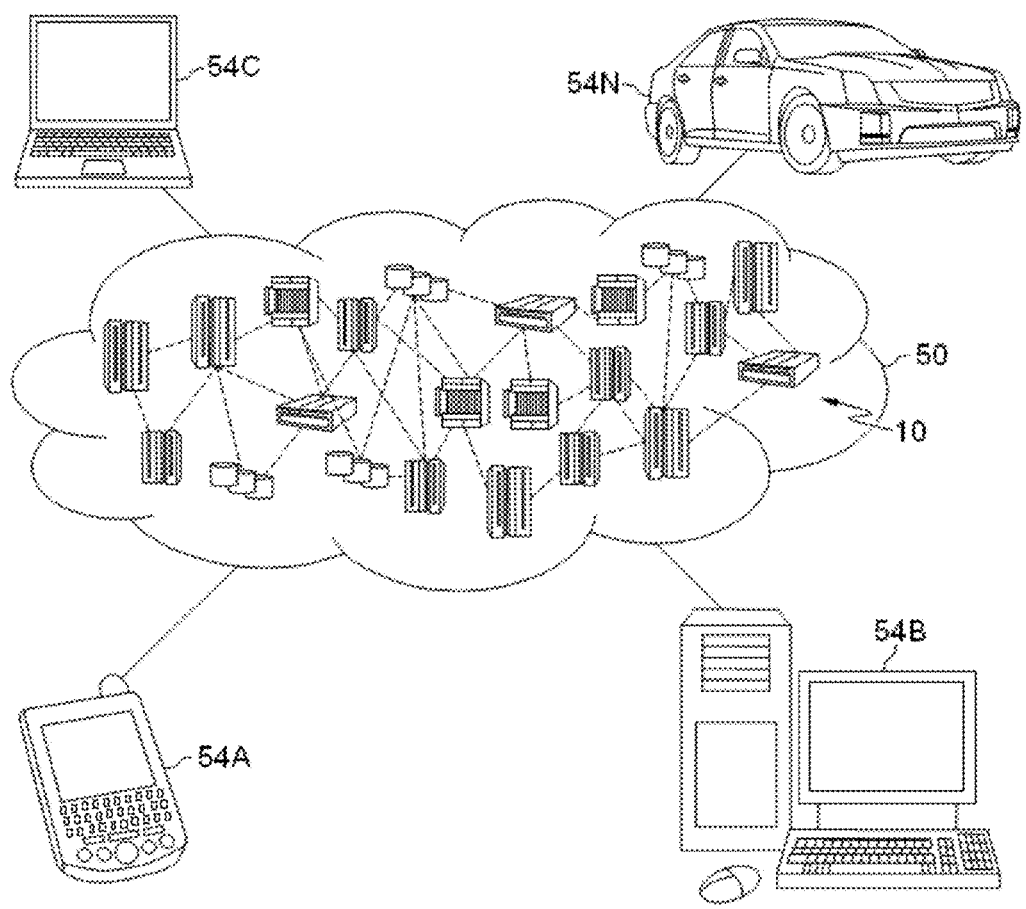
FIG. 2 depicts a cloud computing environment according to one embodiment of the present disclosure.

Referring now to FIG. 2, an illustrative cloud computing environment 50 is depicted. As illustrated, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not illustrated) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N illustrated in FIG. 2 are intended to be illustrative only and that computing nodes 10 and cloud computing environment 50 can communicate with any type of computerized device over any type of network and/or network addressable connection (e.g., using a web browser).

Figure 3:
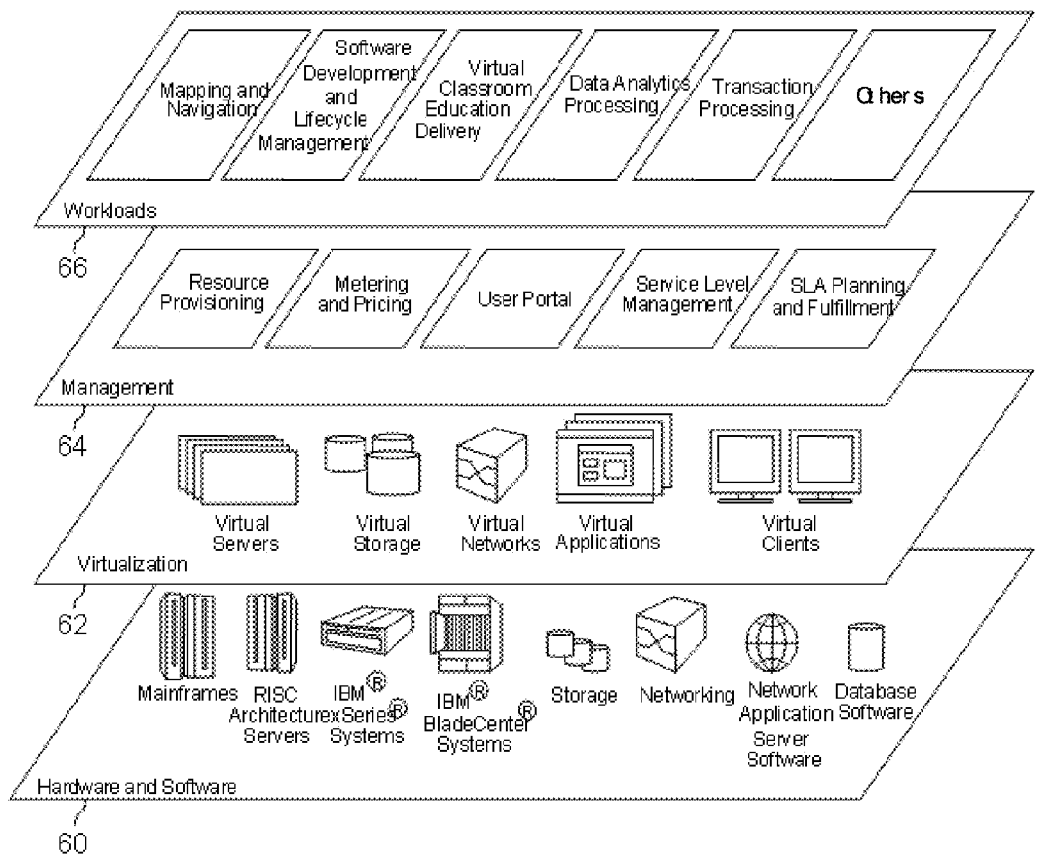
FIG. 3 depicts abstraction model layers according to one embodiment of the present disclosure.

Referring now to FIG. 3, a set of functional abstraction layers provided by cloud computing environment 50 (FIG. 2) are illustrated. It should be understood in advance that the components, layers, and functions illustrated in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing.

Consistent with embodiments, each member in a cluster is an independent computing node. For a cluster consisting of physical machines, each member is an independent physical machine; for a cluster consisting of virtual machines, each member corresponds to a virtual machine. Software installation and configuration may be performed on each node in order to enable respective nodes in a cluster to understand the presence of each other, provide cluster services in collaboration and ensure high availability of applications or services running thereon. For physical machines, this may mean performing the following steps on each physical machine: installing an operating system, configuring the operating system, installing cluster software, configuring the cluster software, installing an application and configuring the application. Similarly, in a cloud computing environment, the setup of a cluster system tool installing and configuring procedures for an operating system, cluster software and an application may be performed on each virtual machine in the cluster.

Figure 4:
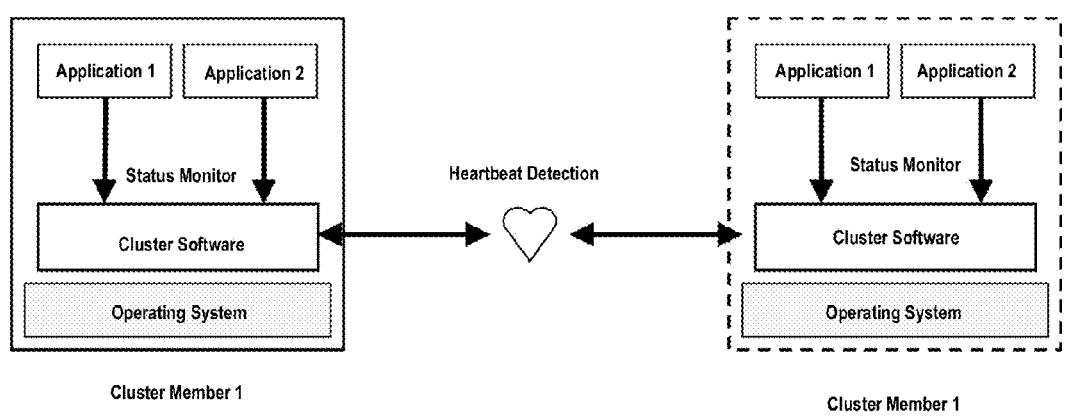
FIG. 4 schematically illustrates cluster members of a cluster system.

FIG. 4 schematically illustrates cluster members of a cluster system. As seen from FIG. 4, the operating system provides a fundamental running environment for all software (including cluster software) on physical machines or virtual machines, and the cluster software monitors applications installed on cluster members and provides required services, such as Web services, database services and the like, for users in collaboration with the applications. While the system is running, cluster software installed on each cluster member (physical machine or virtual machine) is responsible for monitoring the running status of an application running thereon, and cluster members periodically conduct heartbeat detection between each other. When a certain cluster member (e.g. member 1) fails, another cluster member (e.g. member 2) immediately takes over its role and provides services to the user on behalf it. Where necessary, corresponding recovery operation is performed, for example, a physical machine or a virtual machine is restarted.

Cluster configuration information about the entire virtual machine and all software (including operating systems) installed thereon may be encapsulated in an image file after the above software (operating system, cluster software and application software) installation and configuration are completed on a virtual machine of a cluster member. A virtual machine on cluster member 2 can directly use the virtual machine image built on cluster member 1 to construct a virtual machine instance and thereby obtain a software environment. However, cluster configuration information for each cluster member is varying, so the information needs to be modified with respect to each cluster member. This requires huge manual operation, which is quite troublesome; furthermore, this may not be allowed under the cloud computing environment. Therefore, there is a need to automatically configure a cluster member and deploy a cluster.

Figure 5:
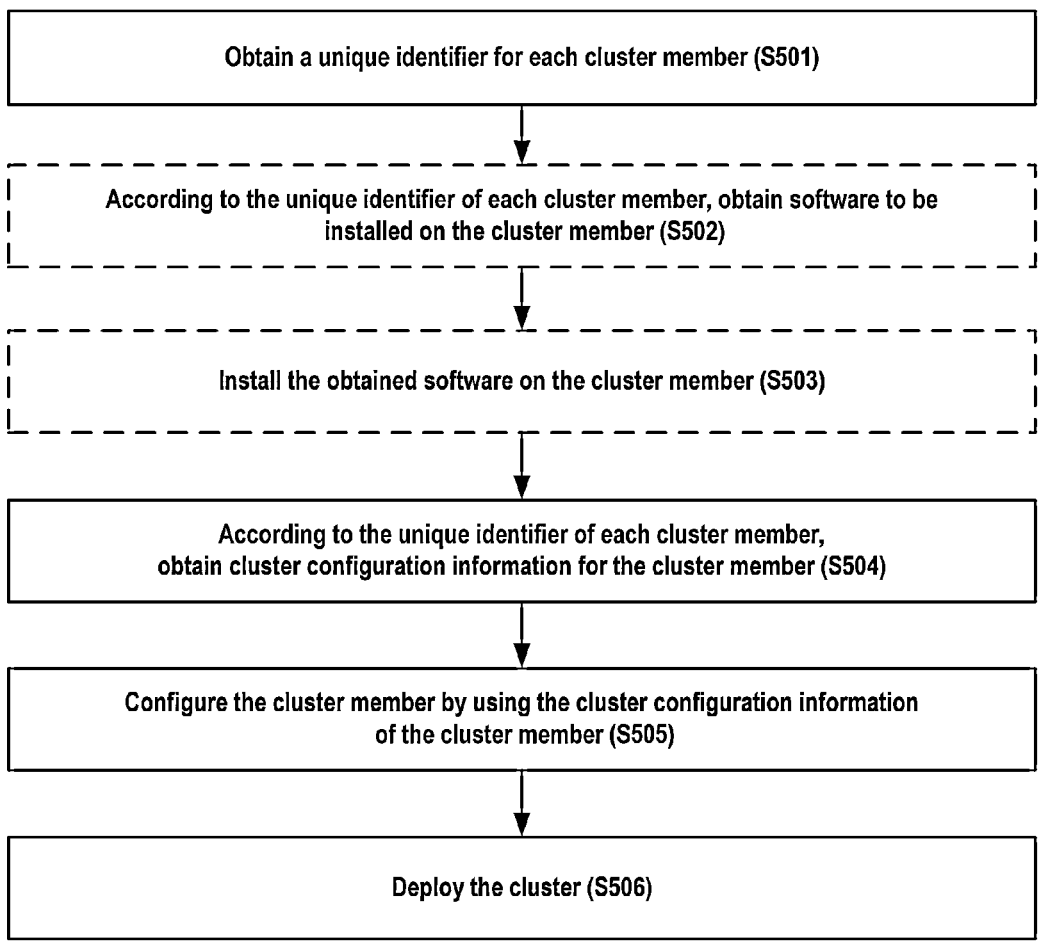
FIG. 5 schematically illustrates a flowchart of a method for deploying a cluster according to one embodiment of the present disclosure.

According to embodiments of the present disclosure, there is disclosed a method for deploying a cluster containing a plurality of cluster members. Each cluster member may be created and initiated in the cluster, and installation of software environment of the cluster's members can be completed using, e.g., an operating system, cluster software and application software installed for the cluster's members, or the software images have been constructed for the cluster's members. FIG. 5 schematically illustrates a method for deploying a cluster according to one embodiment of the present disclosure. According to FIG. 5, the method may include:

in step S501, obtaining a unique identifier for each cluster member;

in step S504, according to the unique identifier of each cluster member, obtaining cluster configuration information for the cluster member;

in step S505, configuring the cluster member using the obtained cluster configuration information of the cluster member; and in step S506, deploying the cluster.

In the above method, the unique identifier of the cluster member can be used for identifying the cluster member and differentiating its function and role; the cluster member's network MAC (Media Access Control) address, IP (Internet Protocol) address or other identifier capable of uniquely identifying the cluster member may be adopted. For the sake of convenience, description is presented by taking the cluster member's network MAC address as its unique identifier, and those skilled in the art may appreciate that the cluster member's other identifier is also applicable.

Cluster members may be physical machines or virtual machines. Hereinafter, virtual machines will be used as demonstrative examples of cluster members. The MAC address of a virtual machine can be generated when a virtual machine monitor (VMM or hypervisor) creates the virtual machine. The VMM can create, according to configuration information specified by a user or administrator, a virtual network device with a specific MAC address and provide it to VM for use. The example below is a portion of a VM definition file of KVM (Kernel Virtual Machine, a kind of hypervisors).

```
<interface type='bridge'>
    <mac address='fa:16:3e:b7:c6:48'/>
    <source bridge='br-int'/>
```

-continued

```
    <virtualport type='openvswitch'>
        <parameters interfaceid='92cbda81-8ab1-46ce-976e-
        12b2d80c9bf4'/>
    </virtualport>
    <target dev='tap92cbda81-8a'/>
    <model type='virtio'/>
    <alias name='net0'/>
    <address type='pci' domain='0x0000' bus='0x00' slot='0x03'
function='0x0'/>
</interface>
```

The above file describes relevant information of a virtual network device; for example, the network connection mode is bridging, the virtual network device is named tap92cbda81-8a, the device model is virtio, etc. The row <mac address='fa:16:3e:b7:c6:48'/> defines a MAC address of a virtual network device for the virtual machine; after the virtual machine is started, its virtual network card device will have this MAC address.

The command "ethtool -P eth0 | awk '{print $3}'" may be used to obtain the virtual machine's MAC address. Where an IP address is used as a unique identifier of the cluster member, the IP address can be obtained using a similar approach. When the cluster member is a physical machine, its unique identifier may be generated and obtained using known methods which are not detailed here.

With respect to step S504 of obtaining cluster configuration information for the cluster member according to the unique identifier of each cluster member, different kinds of clusters serve for different objectives. For example, some clusters may be for web applications, while others may serve for database applications, etc. In some clusters, image files used by respective cluster members, e.g., software being installed, can be the same. Although in some embodiments, MAC addresses may differ for individual cluster members, cluster configurations of respective cluster members may otherwise be very similar. Thus, cluster configuration files of cluster members generated in response to user demands may be very similar. The cluster configuration file can contain a cluster name and a node list, and may further comprise cluster members' software configuration, the number of members, log information, services, resource description, HA policies, etc. One example of a cluster configuration file for a cluster member is shown below:

```
# Cluster configuration file
<cluster name="clus_web">
    <nodes>
        <node name=vm1 id="1"/>
        <node name=vm2 id="2">
    </nodes>
    <rm>
        <service name="webserv">
        ...
    </rm>
</cluster>
```

The example defines a cluster named clus_web, the cluster containing two nodes named vm 1 and vm 2 respectively, and the cluster providing a service named webserv.

The cluster configuration information can be provided by a user when defining the system, and a cluster configuration file formed using deployment file description in a specific format, such as XML, or JSON. Cluster configuration files may be extended when cluster configuration information should be added to the files.

The cluster configuration file of the cluster member may be stored in a cluster data server; a cluster member obtains the cluster configuration file from the cluster data server and places it at an appropriate location, e.g. in an initialized warehouse. Alternatively, the cluster configuration file may directly be stored in the initialized warehouse. Cluster configuration files for members of different clusters may have different storage scenarios; cluster configuration files of different cluster members may be stored in the cluster data server or the initialized warehouse according to unique identifiers of the cluster members. Even in one identical cluster, different cluster members may also use different cluster configuration files. The cluster data server or the initialized warehouse stores a correspondence relationship between cluster configuration information and a unique identifier of a cluster member, and cluster configuration information corresponding to a specified cluster member may be obtained according to the correspondence relationship.

In step S505, the cluster member is configured using the obtained cluster configuration information of the cluster member, and in step S506 the cluster is deployed. These two steps can be executed using known methods that will be described in a subsequent example and not detailed here. Upon completion of the two steps, cluster software installed on the cluster member is in normal running status and becomes a member of the cluster system to provide user-defined services to the outside in collaboration with other cluster members.

In some embodiments, application software installed on members of different cluster can vary considerably; image files used by cluster members may vary also, leading to large storage and maintenance overheads. Although the virtual machine's software environment may have been installed using, i.e., the virtual machine's operating system, cluster software and application software have been installed, and a hard drive where the above software is installed is constructed as a universal-set image file and can be directly applied to other cluster members upon completion of the construction, this universal-set image file is feasible to a couple of clusters. In some embodiments there may be multiple clusters, the application installed on each cluster member varies, even applications installed on members of one cluster are varying, and cluster configuration files differ also. In such embodiments, the installed operating system and cluster software can be built into a basic image file, the basic image file and required applications are uniformly stored in the initialization warehouse, and an explanation of correspondence relationships between application software and unique identifiers of cluster members can be established. According to the explanation, different cluster members can have appropriate application software and basic image files installed according to their own unique identifiers. Sometimes, no basic image file is stored any more, but the operating system and cluster software are integrated with application software and an explanation of correspondence relationships between software and unique identifiers of cluster members is established, according to which explanation different cluster members can have appropriate software installed according to their own unique identifiers. In this embodiment, therefore, the cluster data server or initialized warehouse stores unique identifiers of cluster members, correspondence relationships with software which needs to be installed on these cluster members, as well as software which needs to be installed on all cluster members; according to the correspondence relationships, software packages which need to be installed on a specified cluster member can be obtained. Therefore, the method of FIG. 5 may further include: step S502 of obtaining software which needs to be installed on the cluster member, according to the unique identifier of each cluster member; and step S503 of installing the obtained software on the cluster member.

In this manner, the cluster deployment can be completed automatically. In the concrete implementation, if the cluster deployment is applied in a cloud computing environment, the method is applied on virtualization layer 62 illustrated in FIG. 3, and the method is executed under the control of cluster deployment flow control scripts. That is, each cluster member is a virtual machine, cluster deployment flow control scripts are stored in each cluster member, and in response to the virtual machine of a cluster member being started, the cluster deployment flow control scripts are executed automatically.

Presented below is an example of flow control scripts. Those skilled in the art should understand the following scripts are exemplary only; in actual deployment process, a user can define different scripts according to different demands and achieve different technical requirements, the scripts falling within the protection scope of the present disclosure so long as they satisfy technical features of the present disclosure.

```
 1: CLUSREPO=192.168.1.100
 2: FILESERV=192.168.1.121
 3:
 4: MAC=`ethtool -P eth0 | awk '{ print $3 }'`
 5: scp user@$FILESERV/clusterpkg/list /tmp/flist
 6: files=`cat /tmp/flist`
 7: for f in $files ; do
 8:     scp user@$FILESERV/packages/$f /tmp
 9:     rpm -I /tmp/$f
10: done
11:
12: scp user@$CLUSREPO/cfg-$MAC/cluster.conf /etc/cluster/
13:
14: service cman start; chkconfig cman start
15: service modclusterd start; chkconfig modclusterd start
16: service ricci start; chkconfig ricci start
```

The above cluster deployment flow control scripts are mainly responsible for achieving the following two functions: first, obtaining and installing a software package (e.g. corosync, pacemaker, modclustered and other software package) needed by the cluster member while a virtual machine is starting up; second, configuring the cluster member, such as cluster structure strategies, software configuration, user password information configuration, etc. so as to complete the cluster deployment.

The exemplary cluster deployment flow control scripts contain the following contents:

$1^{st}$-$2^{nd}$ rows: define IP addresses of a file server (FILESERV) and a cluster data server (CLUSREPO), where the file server stores the software packages required for installation;

$4^{th}$ row: obtain MAC address information of the current VM; in response to hypervisor creating and starting a virtual machine, the virtual machine network card device will have an allocated MAC address (the allocation process has been described above). Take the above virtual machine definition file for example. The virtual machine's network equipment information is as below, and its MAC address is FA:16:3E:B7:C6:48.

```
eth0    Link encap:Ethernet  HWaddr FA:16:3E:B7:C6:48
        inet addr:192.168.0.211  Bcast:192.168.0.255
Mask:255.255.255.0
        inet6 addr: fe80::f816:3eff:feb7:c648/64 Scope:Link
        UP BROADCAST RUNNING MULTICAST  MTU:1496
Metric:1
        RX packets:5801358 errors:0 dropped:0 overruns:0 frame:0
        TX packets:918315 errors:0 dropped:0 overruns:0 carrier:0
        collisions:0 txqueuelen:1000
        RX bytes:656611732 (626.1 MiB)  TX bytes:238959572 (227.8
MiB)
```

$5^{th}$-$6^{th}$ rows: by taking the MAC address as an identifier, obtain from the file server the software package to be installed on the virtual machine through network transmission in the VM starting up phase; the file server is a global software package warehouse, which provides all virtual machines in the cluster with required software packages and information needed during the installation and deployment process. The warehouse may be built according to concrete needs by using various technical implementation modes, including simple network file system storage such as NFS (Network File System); also complicated package management systems may be used, such as APT, YUM, etc.

$7^{th}$-$10^{th}$ rows: install software packages;

$12^{th}$ row: obtain cluster configuration information from the cluster data server (CLUSREPO) by taking the MAC address as an identifier. During the execution of this step, the virtual machine will obtain the cluster's configuration file from the cluster server (CLUSREPO). Those skilled in the art may appreciate that in this example the cluster data server and the file server are separated, while in fact they may be integrated as one server without setting up two servers. Or the cluster server is placed in the file server, which is also feasible.

$14^{th}$-$16^{th}$ rows: deploy and start the cluster and make the above cluster configuration to come into effect. During the execution of this step, the VM cluster is configured and started (e.g. Corosync, Pacemaker, etc.).

The scripts may be automatically executed using various methods, for example, they can be configured as automatical-starting Linux service or be placed in a /etc/rc.local file, etc.

In a further embodiment, it is considered providing flexible storage access for the cluster, so that the system storage scale can be dynamically expanded and managed according to storage demands of actual applications; and a network connection with the redundancy attribute may further be provided for the cluster system so that the cluster system has the load balancing ability or connection failure tolerance ability in some extent.

The various embodiments implementing the method of the present disclosure have been described above with reference to the accompanying drawings. Those skilled in the art may understand the method may be implemented as software, hardware or combination of software and hardware. Further, those skilled in the art may understand by implementing various steps in the method as software, hardware or combination of software and hardware, a system for deploying a cluster may be provided based on the same inventive concept. Even though the system has the same hardware structure as a general-purpose processing device, the functionality of software contained therein makes the system manifest distinguishing properties from the general-purpose processing device, thereby forming an apparatus of the various embodiments of the present disclosure. The system of the present disclosure may comprise several tools or modules, the tools or modules being configured to execute corresponding steps. Upon reading this specification, those skilled in the art may understand how to write programs to implement actions executed by the tools or modules. Since the system and the method belong to the same inventive concept, the same or corresponding implementation details are also applicable to the apparatus corresponding to the method. As detailed and complete description has been presented above, it is not detailed below.

Figure 6:
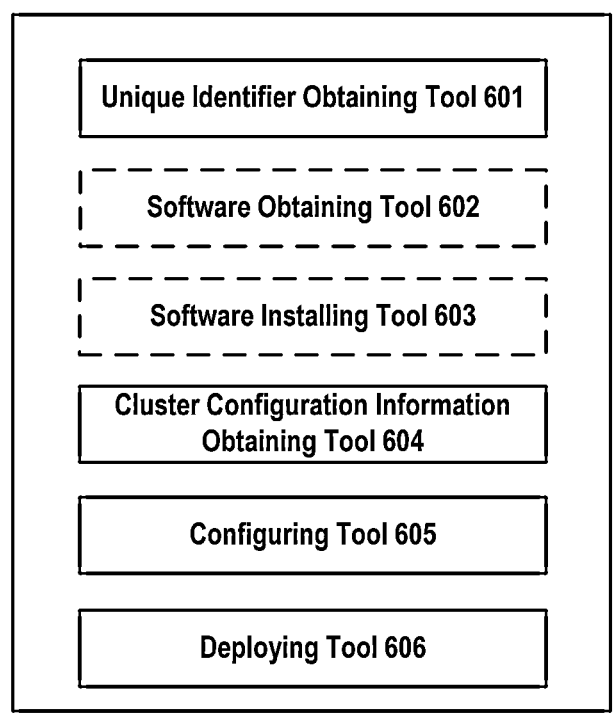
FIG. 6 schematically illustrates a structural block diagram of a system for deploying a cluster according to one embodiment of the present disclosure.

The embodiments of the present disclosure further disclose a system for deploying a cluster, wherein the cluster contains multiple cluster members. FIG. 6 depicts a structural block diagram of a system for deploying a cluster according to one embodiment of the present disclosure. According to FIG. 6, system 600 comprises: unique identifier obtaining tool 601 configured to obtain a unique identifier for each cluster member; cluster configuration information obtaining tool 604 configured to, according to the unique identifier of each cluster member, obtain cluster configuration information for the cluster member; configuring tool 605 configured to configure the cluster member using the obtained cluster configuration information of the cluster member; and deploying tool 606 configured to deploy the cluster.

In one embodiment, the unique identifier of the cluster member is one of: a MAC address of the cluster member; an IP address of the cluster member.

In one embodiment, system 600 further comprises: software obtaining tool 602 configured to, according to the unique identifier of each cluster member, obtain software to be installed on the cluster member; and software installing tool 603 configured to install the obtained software on the cluster member.

In one embodiment, software to be installed on system 600 comprises one of: a universal-set image file; a basic image file and application software; or an operating system, cluster software and application software.

In another embodiment, system 600 stores cluster deployment flow control scripts in each cluster member, each cluster member being a virtual machine, system 600 further comprising: running tool (not illustrated in FIG. 6) configured to, in response to a virtual machine (i.e. a cluster member) being started up, automatically run the cluster deployment flow control scripts, wherein the cluster deployment flow control scripts control the deployment of the cluster system.

In one embodiment, system 600 further comprises: unique identifier creating tool (not illustrated in FIG. 6) configured to, in response to a virtual machine of a cluster member being created, create a unique identifier for the virtual machine member.

In one embodiment, system 600 further comprises: storing tool (not illustrated in FIG. 6) configured to store a correspondence relationship between cluster configuration information of a cluster member and a unique identifier of the cluster member. In a further embodiment, the storing tool is further configured to: store a correspondence relationship between a unique identifier of a cluster member and software to be installed on the cluster member, and software to be installed on all cluster members.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for deploying a cluster having a plurality of cluster members, the method comprising:
   obtaining, by a processor, a unique identifier for each cluster member;
   obtaining, by the processor, cluster configuration information for a particular cluster member based upon the unique identifier of each cluster member;
   storing, by the processor, a first correspondence relationship between the cluster configuration information of the particular cluster member and the unique identifier of the particular cluster member;
   storing, by the processor, a second correspondence relationship between the unique identifier of a particular cluster member and software to be installed on the particular cluster member, and software to be installed on all cluster members;
   configuring, by the processor, the cluster member using the obtained cluster configuration information of the cluster member; and
   deploying, by the processor, the cluster, wherein the cluster is deployed under a cloud computing environment, each cluster member being a virtual machine, storing cluster deployment flow control scripts in each cluster member, automatically running the cluster deployment flow control scripts in response to a virtual machine of a cluster member being started, wherein the cluster deployment flow control scripts control execution of the method.

2. The method of claim 1, wherein the unique identifier of the particular cluster member is selected from the group consisting of a (Media Access Control) MAC address of the cluster member and an Internet Protocol (IP) address of the cluster member.

3. The method of claim 1, further comprising: before obtaining cluster configuration information for the particular cluster member,
   obtaining software to be installed on the particular cluster member based upon the unique identifier of each cluster member; and installing the obtained software on the particular cluster member.

4. The method of claim 3, wherein software to be installed is selected from the group consisting of:
   a universal-set image file;
   a basic image file and application software; and
   an operating system, cluster software and application software.

5. The method of claim 1, further comprising: before obtaining a unique identifier for each cluster member,
   creating a unique identifier for the virtual machine member in response to a virtual machine of a cluster member being created.

6. A system for deploying a cluster having a plurality of cluster members, the system comprising:
   a unique identifier obtaining tool configured to obtain, by a processor, a unique identifier for each cluster member;
   a cluster configuration information obtaining tool configured to, by the processor and according to the unique identifier of each cluster member, obtain cluster configuration information for a particular cluster member;
   storing tool configured to store, by the processor, a first correspondence relationship between cluster configuration information of the particular cluster member and the unique identifier of the particular cluster member and to store, by the processor, a second correspondence relationship between the unique identifier of the particular cluster member and software to be installed on the particular cluster member, and software to be installed on all cluster members;
   a configuring tool configured to configure, by the processor, the particular cluster member using the obtained cluster configuration information of the particular cluster member; and
   a deploying tool configured to deploy, by the processor, the cluster, wherein the cluster is deployed under a cloud computing environment, each cluster member being a virtual machine, storing cluster deployment flow control scripts in each cluster member, the system comprising:
   a running tool configured to automatically run the cluster deployment flow control scripts, by the processor, in response to a virtual machine of a cluster member being started, wherein the cluster deployment flow control scripts control execution of the method.

7. The system of claim 6, wherein the unique identifier of the particular cluster member is selected from the group consisting of a Media Access Control (MAC) address of the cluster member and an Internet Protocol (IP) address of the cluster member.

8. The system of claim 6, further comprising:
   a software obtaining tool configured to, according to the unique identifier of each cluster member, obtain software to be installed on the particular cluster member; and
   a software installing tool configured to install the obtained software on the cluster member.

9. The system of claim 8, wherein software to be installed is selected from the group consisting of:
   a universal-set image file;
   a basic image file and application software; and
   an operating system, cluster software and application software.

10. The system of claim 6, the system further comprising:
a unique identifier creating tool configured to, in response to a virtual machine of a cluster member being created, create a unique identifier for the virtual machine member.

* * * * *